(12) United States Patent
Cormier

(10) Patent No.: US 7,543,019 B1
(45) Date of Patent: Jun. 2, 2009

(54) METHODS AND APPARATUS PROVIDING BACKWARD COMPATIBILITY FOR APPLICATIONS THAT ACCESS A CHANGING OBJECT MODEL

(75) Inventor: Richard Francis Cormier, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 971 days.

(21) Appl. No.: 10/814,666

(22) Filed: Mar. 31, 2004

(51) Int. Cl.
G06F 15/16 (2006.01)

(52) U.S. Cl. ................. 709/203; 709/219; 709/248; 707/103 R; 717/108; 717/165; 719/315; 719/316; 719/332

(58) Field of Classification Search ............. 709/203, 709/219, 248; 707/103 R; 717/108, 165; 719/315, 316, 332
See application file for complete search history.

(56) References Cited

U.S. PATENT DOCUMENTS

| | | | | | |
|---|---|---|---|---|---|
| 5,437,025 | A | * | 7/1995 | Bale et al. ............... | 707/103 R |
| 5,619,638 | A | * | 4/1997 | Duggan et al. ............. | 715/781 |
| 5,732,257 | A | * | 3/1998 | Atkinson et al. ............. | 707/4 |
| 5,872,973 | A | * | 2/1999 | Mitchell et al. ............. | 719/332 |
| 5,892,909 | A | * | 4/1999 | Grasso et al. ............... | 709/201 |
| 5,974,428 | A | * | 10/1999 | Gerard et al. ............... | 707/203 |
| 6,009,458 | A | * | 12/1999 | Hawkins et al. ............. | 709/203 |
| 6,023,704 | A | * | 2/2000 | Gerard et al. ............. | 707/103 R |
| 6,119,130 | A | * | 9/2000 | Nguyen et al. ............. | 707/203 |
| 6,263,360 | B1 | * | 7/2001 | Arnold et al. ............... | 709/203 |
| 6,604,196 | B1 | * | 8/2003 | Monday et al. ............. | 713/100 |
| 6,978,452 | B2 | * | 12/2005 | Oesterreicher et al. ...... | 717/171 |
| 7,082,116 | B2 | * | 7/2006 | Reza et al. .................. | 370/338 |
| 2003/0033442 | A1 | * | 2/2003 | Halpern et al. ............. | 709/315 |
| 2004/0068579 | A1 | * | 4/2004 | Marmigere et al. ......... | 709/242 |

* cited by examiner

*Primary Examiner*—Michael Won
(74) *Attorney, Agent, or Firm*—Chapin IP Law, LLC; Barry W. Chapin, Esq.

(57) ABSTRACT

An object adapter within a server application processes client requests supporting a plurality of object models by receiving a former client request requiring access to a former object defined by a former object model. The server application maps any former objects required for access by the former client request to corresponding current objects existing within a current object model and then copies current object data within the current objects of the current object model to former object data within an instantiations of the former objects. The server application can then process the former client request using the instantiation of the former object to satisfy the former client request. The system provides compatibility to former clients and allows them to remain in service when an object model evolves.

26 Claims, 6 Drawing Sheets

METHODS AND APPARATUS PROVIDING BACKWARD COMPATIBILITY FOR APPLICATIONS THAT ACCESS A CHANGING OBJECT MODEL

BACKGROUND

Conventional data processing systems rely on the ability of software applications that execute within computer systems to efficiently interoperate to exchange data to perform processing operations on the data. Software designers often develop conventional software applications using object-oriented computer programming languages such as C++ and/or Java. Using an object-oriented programming language environment, a software developer can write software code that defines a set of objects as object or class definitions contained within an object model. A typical object defined by a class in an object model contains data structure definitions that store data to be manipulated by the software application. In addition, the object can further define methods or functions that the software application can use during operation to manipulate the data stored within the data structure definitions for that object.

During operation (e.g., execution or interpretation) of a conventional software application developed using an object-oriented programming language, the software application instantiates an object from the object model and populates its data structure definitions with application data received from an input source. Once such objects are instantiated, the application can use the functions or methods defined within the object to manipulate or otherwise access or process the data stored within the data structures of the object in response to calls to those methods or functions. One beneficial feature of the conventional object-oriented software development paradigm is that objects can inherit from one another (i.e., can be built upon top of one another) as a series of building blocks and once an object is developed and tested, it can be reused for many different purposes thus saving development time for future versions or revisions of a software application.

Other conventional software development technologies provide software developers with the ability to create distributed software applications, also referred to herein as client server software applications. Generally, a distributed software application includes two or more separately operating portions of software application code, such as a client portion of code and a server portion of code, that typically execute on different computer systems during run-time operation of the software application.

As an example, software developers may create a client software application (hereinafter referred to simply as a client) that executes on a client computer system and provides a graphical user interface or other processing for interaction with an end-user of the software application during run-time. The client may further include software code that receives and converts user input obtained from a graphical user interface into object-oriented data structures (i.e., objects) that the client then transmits using client requests to a server software application (hereinafter referred to as a server) for processing. The data transferred between the client and the server typically has an agreed upon format and may be encoded in a formatting or markup language such as the extensible markup language (XML). XML formatted objects can be transferred from the client to the server using a remote method invocation protocol such as the Simple Object Access Protocol (SOAP) or by using a conventional distributed software development and operating environment such as the Common Object Request Broker Architecture (CORBA).

Generally however, to perform this type of processing, the client requires access to the object model containing the object definitions to be used for transmission of client data within client requests to the server. The server in turn receives the client requests and processes these requests using objects from the same object model that defines the objects containing the data structures provided from that client within the client requests. The server may further operate to process the client request data within client objects and produce response data that the server stores in these same objects for transmission back to the client within one or more server responses (again using SOAP/XML or CORBA, for example). Generally then, even though the client and server are developed and execute as separate individual software programs, applications or processes within different computer systems, they are able to interact with each other by both referencing the same object-oriented data structures defined in objects within a common or shared object model referenced by both the client and server software applications.

SUMMARY

Conventional mechanisms for development and execution of software applications that rely on a common or shared object model suffer from a variety of deficiencies. In particular, if both the client and server portions of a software application are developed using a common object model that is shared, and subsequent revisions to the application require changes to be made to that object model, both the client and server software application code must be modified in order to accommodate those changes made to the shared object model. This may be highly problematic since the client and server portions of the software application may be distributed in numerous computer systems distributed potentially worldwide. Accordingly, if a modification is made to an object model in a conventional development environment, all instances of both the server and the client must be updated to reflect the changes in the object model in order for the existing installed base of clients and servers to be compatible with one another.

As a brief example of this difficulty, if a function or method call within an object is changed in some manner in a new or current version of the object model (e.g., data fields or method parameters are added, change or removed in an object), the server application code must be recompiled in order to account for the changes from the former object model to the newly updated (i.e., current) object model. In addition, any client applications that interact with that server (that uses the current object model containing client does not attempt to access the current object model provided by the server using the former function call format that now exists within the current object. If this were to occur, since the object formats of the client and server were no longer the same, a processing error could potentially cause the server application to fail in its execution, thus disrupting operation of other clients that also rely on that server.

Generally then, in distributed software applications in which separate portions of the application execute independently on different computer systems, changes to a commonly shared object model must be carefully orchestrated within each of the different portions of the application to avoid failures of the application altogether.

One conventional solution to this problem is a brute force approach in which all required portions of the software application that use the old object model (e.g., former clients and former servers) and portions of the software application that use the new object model (i.e., current clients and current servers) are both maintained in parallel and operate concurrently with each other. As an example, a former version of the client that was formerly developed using a former object model could continue to operate and interact with a former version of the server that was also developed using the former object model. Any changes to the object model would result in a current or new object model and the deployment of an entirely new set of client and server applications that are based on the new object model, while the former versions are also allowed to operate concurrently with the current versions. This solution is considerably cumbersome since it requires multiple versions of a software application to execute concurrently and results in significant maintenance, resource utilization and operations management issues.

A second solution to the problem of handling changes in an object model is to maintain all operational aspects of the former object model within the new object model so that a single model always exists that is backward compatible with clients or servers requiring the former version. Using this solution, portions of the software application developed using only the former object model will correctly operate to access objects defined within the current object model that continue to contain data definitions and method invocations required by the former version clients and server. Using this conventional solution, if a method invocation within an object contains different parameters for three different versions of the object model, the object that conforms to this solution would contain each of the three separate method invocations (separately named for each of the newer versions) and each method invocation contains the appropriate parameters corresponding to the three different versions of the object model. Accordingly, software applications that execute and require access to the either the first, second or third versions of the method invocation will be able to use the same object model and former method invocations continue to be supported (i.e., continue to exist) within the most recent version of the object model.

This conventional solution is also fraught with problems since object definitions (i.e., classes) become cluttered with data definitions and method invocations used by former versions of the software application thus cluttering newer enhancements to the object model. Accordingly, subsequent software development efforts are hindered by having to sort through and keep track of which function calls and data definitions within object classes are for the most recent version of the object model while still maintaining proper functionality for former method invocations associated with former versions of the object model.

One conventional technique to alleviate the symptoms associated with this problem is to provide deprecated methods or function calls. Deprecation of a function call allows a software developer to mark or otherwise indicate, within the software code, that a particular function call or data structure is only used by a former version of the software (i.e., a former object model data reference, methods or function call). Once marked in this manner, during compile time of the software application using the object model containing objects with deprecated data or methods, the compiler generates warning messages to the software developer indicating that the function calls are deprecated and may be soon going away. In other words, deprecation of a function call is technique to identify, at compile time, those data definitions or methods that are part of an older version of the software.

Using deprecation, if a developer assumes that he or she is compiling a new version of the software that uses only the newest versions of data and method invocations, and he or she receives a deprecated warning during compile time, the deprecated warning indicates that the software is referencing deprecated information (i.e., an outdated or former data reference or method invocation within the object model that is scheduled to be removed in a future release of the software. Upon seeing such a warning, the software developer can modify the code accordingly so that it only uses non-deprecated functions and data definitions for the current or most recent version of the object model. One problem with deprecation is that in programming languages such as Java, using deprecation can cause a method invocation to have to be renamed in a subsequent version of the software because a return type from the method may have changed between the two versions of the object model. Thus a newer version of the method may be incompatible with the former version of the method that has been deprecated. Another problem with using deprecated functions is that a newer version of the software may still reference the older deprecated function and the developer may not notice the deprecation warning.

Embodiments of the invention significantly overcome the aforementioned deficiencies in which two or more versions of an object model are required for use to maintain operation of two or more versions of a software application. As noted above, conventional software development and processing techniques make it difficult to be able to use two or more versions of an object model at the same time since each version of the software application is written to only use a single object model. In contrast, according to embodiments of the invention, if for example a version 1 (i.e., former) client requires use of a version 1 object model and a version 2 (i.e., current) client requires use of a version 2 object model, embodiments of the invention provide mechanisms and techniques that allow the version 1 client to be able to use a server based the version 2 object model without making changes to the version 1 client. In addition, using embodiments of the invention, version 2 clients can operate with the same server application that uses the version 2 object model. Moreover, embodiments of the invention only require a single current object model that does not require old methods and data definitions to be maintained or deprecated. Thus the current object model can be kept clean of former data definitions and method invocations no longer in use. Accordingly, if a customer facility operates many instances of the version 1 client, using embodiments of the invention, the customer may upgrade the server portion of the software application to a version 2 object model and will not be required to upgrade the version 1 clients at the same time.

Embodiments of the invention significantly overcome problems encountered by conventional solutions that attempt to use a single object model that maintains backward compatibility with former versions of that object model. Such problems result when an object model is strongly-typed, meaning that the clients are compiled knowing what the object model contains in the form of object names, data types and function or method invocation names and parameters. In such situations, conventional solutions do not solve the problem that arises when a version 1 client attempts to compile an object model on a method that is modified from its original return value. In contrast, embodiments of the invention provide a system in which the version 1 client can continue to operate in accordance with the version 1 object model even though a server or other portion of the software application with which that client interacts is currently developed and operating using a subsequent version of the object model that may have different return types on its method invocations.

More specifically, embodiments of the invention provide an object adapter application and process that operates between a former version of the software application and a current version of the software application that uses an updated object model. Embodiments of the invention provide support for processing client requests that require support of a plurality of object models. As an example, a portion of a software application, referred to herein as a client, may be developed using an older or former version of an object model, while another portion of the software such as a server may include embodiments of the invention that are developed with a new or current version of the object model. The new version of the object model needs only to contain the newest data definitions and method invocations and need not contain deprecated methods and data for backwards compatibility. Even though the current object model is not directly backward compatible with the former clients (that require the former version of the object model), embodiments of the invention are operable to allow the former clients to be supported and access objects that conform to the former object model (to which the former clients require conformance), as explained herein.

It is to be understood that as used herein, the terms client and server are intended to simply indicate separately operating portions of a software application and are not intended to further limit the meaning or scope of embodiments of the invention. Plus a former or current client is an independently operating software process while a former or current server is another independently operating software process. Clients and servers are related in fact that they communicate with each other, but the terms client and server are not intended to imply other limitations in their operation.

Embodiments of the invention operate, for example, in a server computer system within a server application and receive (i.e., over a network or other communications link), from a former client, a former client request requiring access to a former object defined by a former object model (i.e., an older version of the object model). The system of the invention within the server computer system maps a former object required for access by the former client request to a corresponding current object (i.e., a most recent or new version of an object) existing within a current object model (i.e., a most recent or newer version of the object model in relation to the former version) maintained by the system of the invention. To perform the former to current object mapping processing as explained herein, the invention provides an object map that indicates what current objects correspond to former objects defined in a former object definition file (e.g. a java bytecode file or *.jar or "jar" file) and what data and methods within those current objects correspond to data and methods in the former objects. The object map can also indicate information used to identify an object adapter class that can be used to copy the data from the current object to an instantiation of the former object. The invention operates the proper object adapter (from the adapter class) to copy current object data within the current object of the current object model to former object data within an instantiation of the former object for access during processing of the client request.

In other words, the system of the invention extracts and copies data from fields of the current object defined within the current object database or repository to an instantiation of the former object. Thereafter, an application configured with embodiments of the invention can process the former client request using the instantiation of the former object to satisfy the former client request. Processing the former client request may thereafter include passing the former client request to other software processes or programs for processing in conjunction with the former object instantiation(s), or the former client request may be processed locally.

Since the former request requires the now instantiated former object conforming to the former object definitions, and these former object structures are populated with data from the current object definitions as explained herein, the system of the invention allows full processing of the former client requests using instantiations of the former object but that are derived from the current object definitions. As such, the current object model containing the most recent object classes (i.e., object definitions) does not need to maintain deprecated data definitions.

In other embodiments of the invention, the operations of receiving a former client request, mapping a former object to a corresponding current object, copying current object data within the current object to former object data within an instantiation of the former object and processing the former client request are performed within a current version of a storage area network management application, such as a API server for access to a storage area network management database of managed objects that represent resources in a storage area network to be managed. In such an embodiment, receiving a former client request comprises receiving the former client request from a former version of a storage area network management client application. That is, in this embodiment the client is a client that operates as part of the storage area network management application to obtain access to managed object data in a managed object database. The former client requests thus contain a request for access to former storage area network management object data contained within former objects defined by a former object model that has been replaced by the current object model in use at the current time. The processing operations or steps of mapping, copying and processing the former client request allow the former version of the storage area network management client application to operate with the current version of the storage area network management application (e.g., an application programming interface server providing network access to the storage area network managed objects) that maintains storage area network management data within current storage area network managed objects conforming to the current object model.

Other embodiments of the invention include a computerized device, such as a server or client computer system or storage area network management computer system, workstation or other computerized device configured to operate a server application capable of processing all of the method operations disclosed herein as embodiments of the invention. In such embodiments, the computerized device includes a memory system, a processor, a communications interface and an interconnection mechanism connecting these components. The memory system is encoded with a server application including an object adapter that when performed on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations of the server application and object adapter processes, as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, clients, hosts or other entities can also provide the system of the invention. The system of the invention can be distributed between many software processes on several computers, or all processes could run on a small set of dedicated computers, or on one computer alone.

It is to be understood that the system of the invention can be embodied strictly as a software program, as software and hardware, or as hardware alone. Example embodiments of the invention may be implemented within EMC's Control Center software application that provides management and agent load balancing functionality for assignment of management responsibility to storage area network resources and in computerized devices that operate the Control Center software. Control Center is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
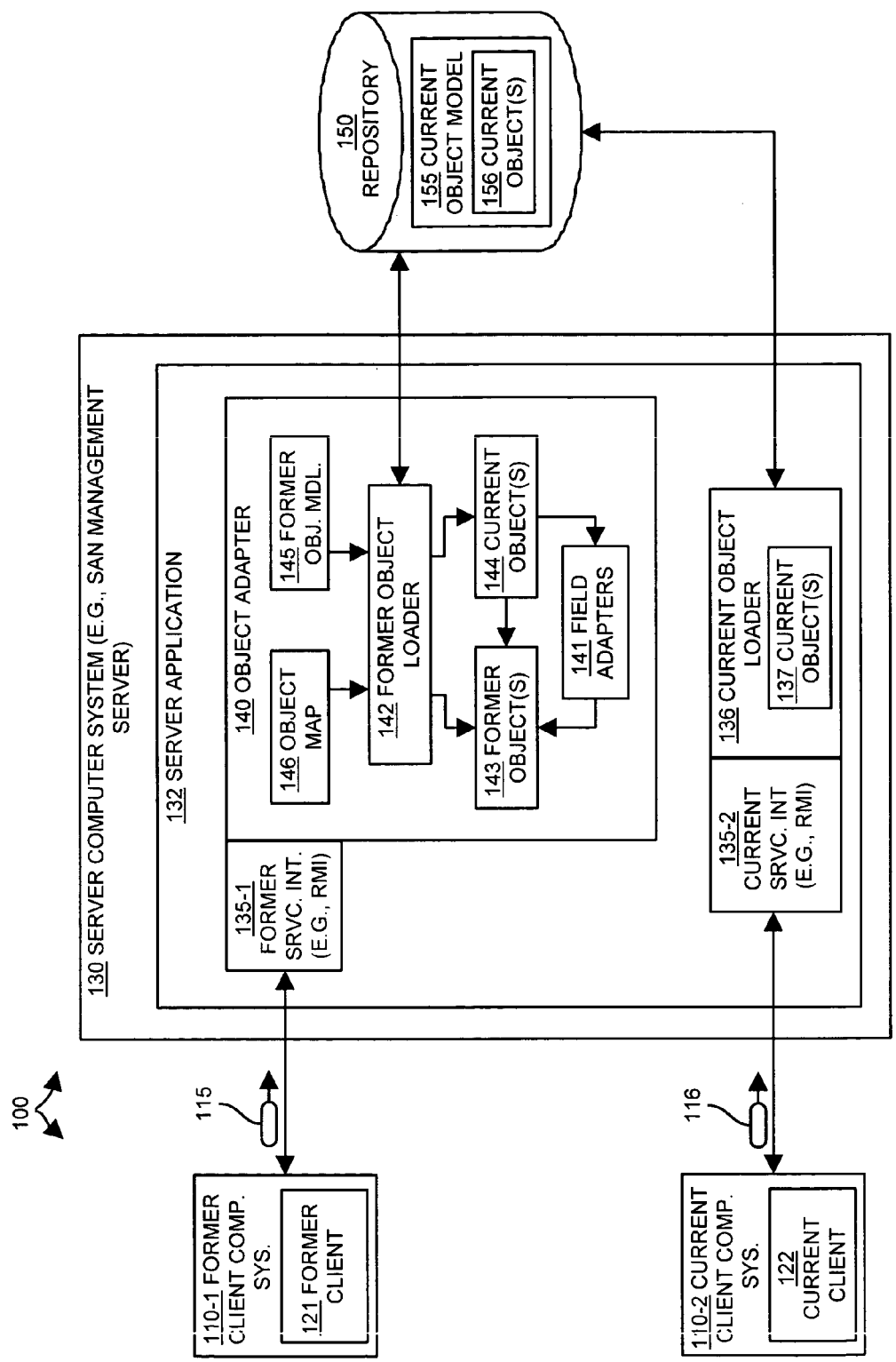
FIG. 1 illustrates an example storage area network and computing system environment including server application and object adapter configured to operate according to embodiments of the invention.

FIG. 1 illustrates a computing system environment 100 including a server computer system 130 configured in accordance with an example embodiment of the invention. The computing system environment 100 includes a plurality of client computer systems 110 (two in this example, 110-1 and 110-2 and it is to be understood that there can be many more clients not shown due to drawings space limitations). Each client computer system 110-1 and 110-2 operates (e.g., executes, interprets or otherwise performs) a respective client process 121 and 122. The client process 121 is referred to for purposes of this explanation as a "former" client 121 and is a software application that is developed in conformance with a former object model definition 145. Likewise, the client process 122 is referred to for purposes of this explanation as a "current" client 122 and is a software application that is developed in conformance with a current object model 155. During operation, each client 121 and 122 provides a respective client request 115 (for former client 121) and 116 (for current client 122) to the server computer system 130 for processing by a server application 132 configured in accordance with embodiments of the invention.

In this example, the server application 132 is a software application that services the respective client requests 115 and 116 via respective service interfaces 135-1 and 135-2 in order to provide access to data contained within current objects 156 defined within a current object model 155. Each service interface 135 is a remote invocation interface for processing request transmitted over a communications channel such as the network 15. As will be explained shortly however, when former client 121 requests access to object data, the former client 121 sends the former request 115 to the former service interface 135-1 that forwards this request 115 to the object adapter 140 configured according to embodiments of the invention. The object adapter 140 maps the data defined within the current object 156 into instantiations of former objects 143 in order to maintain compatibility with a former client 121. A repository 150 is used to store or otherwise maintain a current object model 155 and all of its associated current objects 156-1 through 156-Y. In this example embodiment, the server application 132 includes an object adapter 140 includes an object map 146 Dennis capable of mapping current objects 156 (and their instantiations 144) to former objects 143 instantiated from use of the object map 146 and the former object model definition 145 as will be explained herein. In addition, the server application 132 includes a current object loader 136.

Generally, embodiments of the invention thus provide a data processing system such as that illustrated in FIG. 1 that operates to allow a former version of a software application such as the former client 121, that was created with former object oriented data structures from a former object model (the former object model being based on the former object model definition file 145), to interoperate with a current version of a software application such as the server application 132 that was created with an updated or current object model 155. As used in this invention, the term client 121, 122 refers to a program, software application, or independently operating entity that might even be hardware based and that uses a communications medium such as a network 101 to communicate with the server computer system 130 and server application 132. The term server or server application 132 as used herein also denotes an independently operating software application. Alternatively, the term client can generally be used to refer to the client computer systems 110 executing clients (e.g., executing either the former or current client) and the term server can generally be used to refer to the server computer system 130 executing an instance of the server application 132 as explained herein.

In one embodiment of the invention, the former object model definition 145 may be, for example, a Java byte code file (a jar file, *.jar) that contains class definitions for the instantiations of former objects 143 that existed and that are required for use by former versions of either the server application 132 or former clients 121. The former client 121 is a software application that is designed to interoperate with classes that defined former objects 143 having data and method invocations that conform to those defined within the former object model definition 145. The current object model 155 is based on the most recent version of a current object model definition 157 and represents the latest, most recent or current implementation of the object model. In a typical development scenario, the current object model definition 155 is based upon the former object model definition 145 but contains object definitions that may be modified in some manner. As an example, certain classes defined within the current object model definition 157 may have been added to, modified or deleted in terms of data definitions and/or method invocations as compared to the former object model definition 145.

Embodiments of the invention provide the object adapter 140 that allows former clients 121 to interoperate with a current version of the server application 132 in order to allow those former clients 121 to gain access to the data defined within the current objects 156 within the current object model 155, but such data access is provided through instantiations of former objects 143 that conform to the method invocations and data structure formats required for proper operation with the former client 121. In other words, the object adapter 140 of this invention is capable of mapping data and information within the current object definitions 156 into instantiations of former objects 143 in order to allow the server application 132 to process former client request 115 that require access to the structures and methods defined within those former object instantiations 143.

Further details of processing techniques provided by embodiments of the invention will now be explained with respect to a series of flowcharts and processing steps performed by embodiments of the invention.

Figure 2:
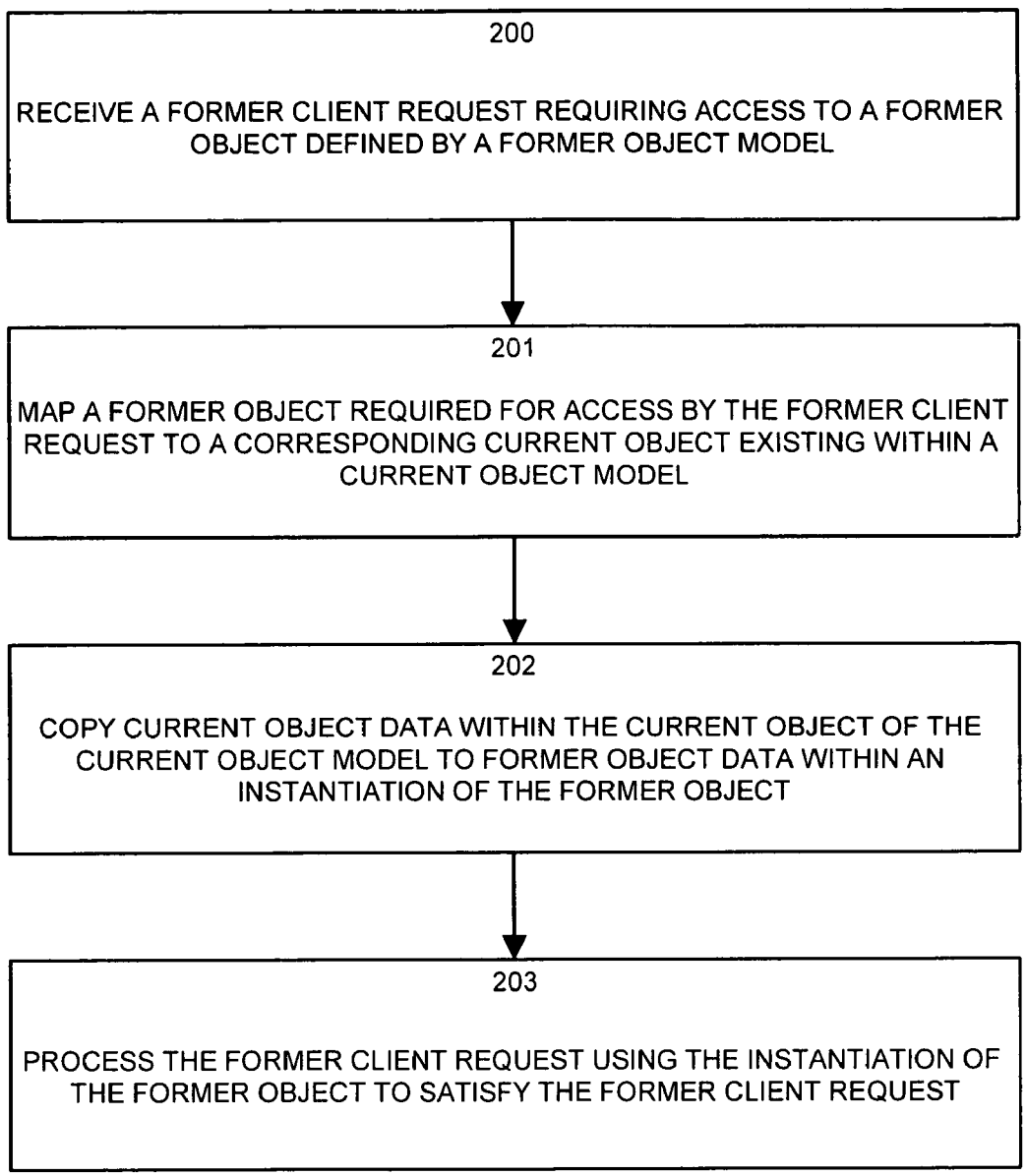
FIG. 2 is a flow chart of processing steps that show the general operation of a management application process configured to provide object model compatibility according to embodiments of the invention.

FIG. 2 is a flow chart of processing steps performed by server computer system 130 configured with an object adapter 140 arranged in accordance with embodiments of the invention in order to process client requests 115 and 116 to support a plurality of object models (i.e., both former and current object models). The processing steps in FIG. 2 generally allow a former client 121 to access the server application 132 even though the server application 132 is developed to operate with classes and objects from the current object model 155, as illustrated in the above examples in FIGS. 1 and 2.

To provide the capability, in step 200, the server application 132 receives a former client request 115 requiring access to a former object 143 defined by a former object model 145. The server application 132 is able to receive the former client request object adapter 140. As will be explained further, the object adapter 140 is able to identify former objects that are referenced within the former client request 115 and can create instantiations 143 of the former objects by referencing the former object model definition file 145. The former object model definition file 145 may be, for example, a Java byte code file (a jar file, *.jar) that contains class definitions that can be used to create the instantiations of former objects 143. Using a technique such as Java reflection, the object adapter 140 identifies and instantiates the former objects 143.

Next, in step 201, the object adapter 140 within the server application 132 maps the former object 143 required for access by the former client 115 request to a corresponding current object 144 existing within a current object model 155. As noted above, the current object model 155 contains a set of current objects 156 in a repository 150. Each current object 156 in the repository contains the most recent data content and structure that includes any changes (e.g., additions or deletions or modification) from the former object model definition 145 (i.e., an older version of the same object model). The former object model definition 145 thus contains older versions of class descriptions for objects contained in the current object model 156.

The object map 146 is a table, list or other type of data structure that maps or interrelates or cross-references current objects 156 to corresponding former object definitions within the former object model definition 145. The outcome of mapping the former object 143 (i.e., the object requested for access in the former request 115) to a corresponding current object 144 existing within a current object model 155 is an identification of one or more current objects 156 within the current object model that contain data that can be used to populate an instantiation of the former object(s) 143 requested by the former client request 115.

In step 202, the object adapter 140 within the server application 132 copies current object data within the current object 144 (an instantiation of a current object 156) of the current object model 155 (i.e., obtained from the repository 150) to former object data within an instantiation of the former object 143 (obtained using reflection on the former object model definition 145). Accordingly, the object adapter 140 populates the instantiation of the former object 143 with current object data that maps from each data field in the instantiation of the current object 144 to each data field in the instantiation of the former object 143. This copy process can include the use of field adapters 141, as will be explained, that map data in fields in current objects 156 to data in fields of the former objects 143. Using a naming convention, the object adapter 140 can determine if there is a field adapter for each data field within the former object 143. For example, the field adapter class can have a similar name as the field to be mapped. If such a field adapter exists, the object adapter 140 can use this adapter to translate, convert or otherwise massage the data from the current object 156 into the appropriate data field(s) in the instantiation of the former object 143.

The processing of steps 201 and 202 is repeated for each former object 143 (and for each data field in those objects) that the former client request 115 requires to be instantiated so that a complete set of former objects are provided for servicing of the former client request 115.

Thereafter, in step 203, the object adapter 140 processes the former client request 115 using the instantiation of the former object(s) 143 to satisfy the former client request 115. In other words, now that the former object(s) 143 are instantiated in memory and are populated with data from fields of current objects 156, the set of now existing former objects 143 can be used for processing of the former request 115.

Figure 3:
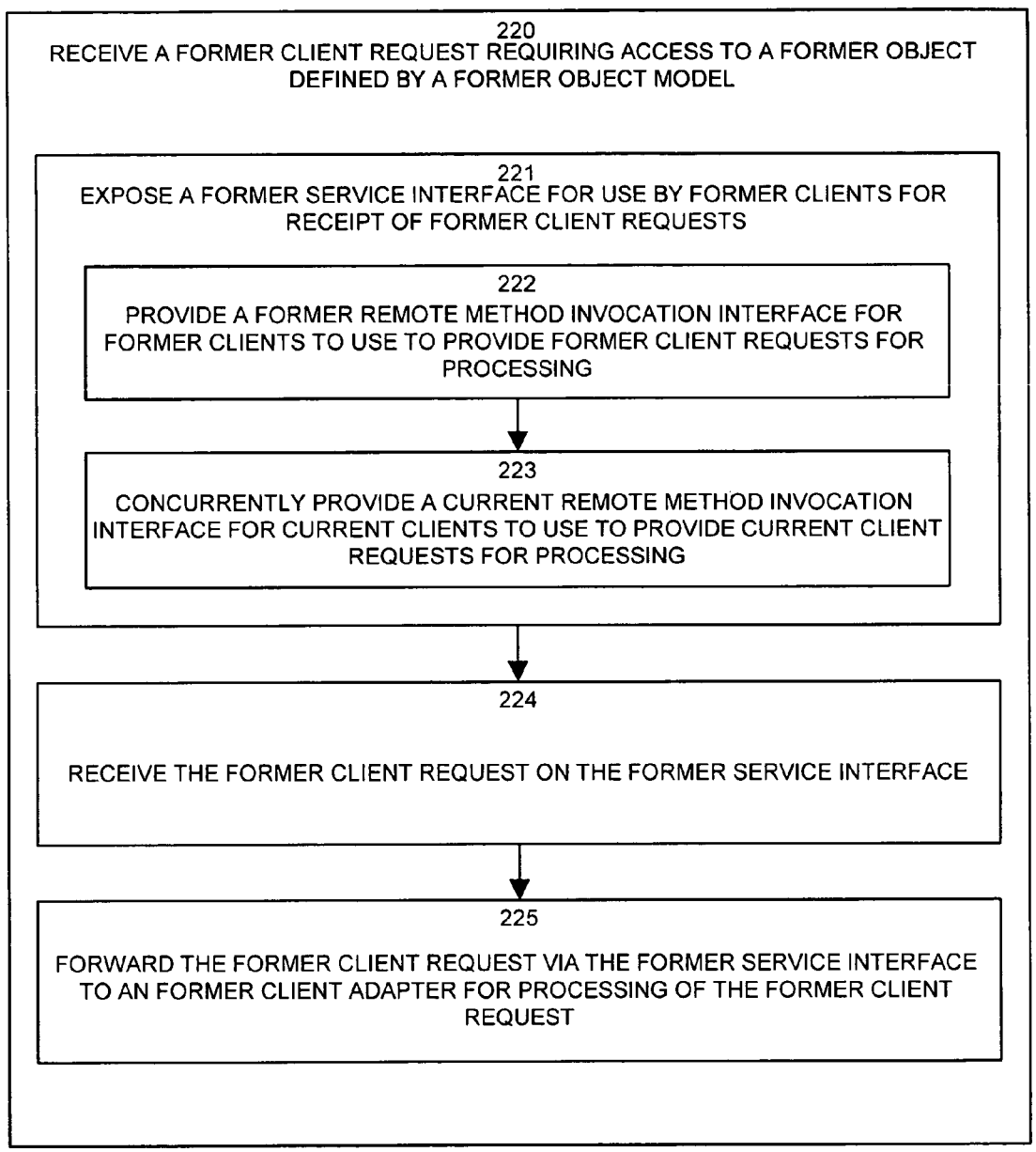
FIG. 3 is a flow chart of processing steps that a server application configured according to embodiments of the invention performs to receive a former client request requiring access to a former object defined by a former object model.

FIG. 3 is a flow chart of processing steps that a server application 132 configured according to embodiments of the invention performs to receive a former client request 115 requiring access to a former object 143 defined by a former object model 145. That is, the flow chart in FIG. 3 shows details of processing step 200 from FIG. 2.

In step 221, the server application 132 exposes a former service interface 135-1 for use by former clients for receipt of former client requests 115. As noted above, the former service interface 1 35-1 may be a remote method invocation (RMI) interface associated with the former version of the former client 121 and may be based on a object sharing software development platform such as CORBA.

In sub-step 222, the server application 132 provides a former remote method invocation interface for former clients to use to provide former client requests for processing. As such, all former versions of the client 121 utilize the former service interface 135.1.

In step 223, the server application 132 concurrently provides a current remote method invocation interface 135-2 for current clients 122 to use to provide current client requests 116 for processing. As such, all current versions of the client 122 utilize (i.e., forward current requests to be received by) the current service interface 135-2. Note that the current service interface 135-2 forwards all current client requests 116 to a current object loader 136 that is able to directly access to repository 154 for direct access to data within current objects 156. In other words, all clients 122 developed with the most recent version of the current object model 155 are able to provide requests processed by the current object loader 136 which may be, for example, the default or system object loader which is capable directly accessing the repository 154 to load the current objects 156 without use of the object adapter 140 provided in accordance with embodiments of the invention. In this manner, by providing different remote method invocation interfaces, one for each older version of clients, each different former service interface (e.g., each different RMI interface corresponding to different versions of clients) can direct requests to a distinct object adapter 140 (e.g., 140-1 . . . 140-W, not specifically shown) that uses a different object map 146, such that embodiments of the invention can provide backward compatibility for multiple clients that are built with different former versions of the object model 145 in relation to the current object model 155.

Next, in step 224, the server application 132 receives the former client request 115 on the former service interface.

In step 225, the server application 132 forwards the former client request via the former service interface to the object adapter 140 (i.e., a former client adapter designed to process requests from clients build according to a specific version of the object model) for processing of the former client request 115.

After processing operations in FIG. 3 complete, the object adapter 140 has received a former client request 115 and begins to process of generating former object instantiation 143 for access in accordance with this request 115.

Figure 4:
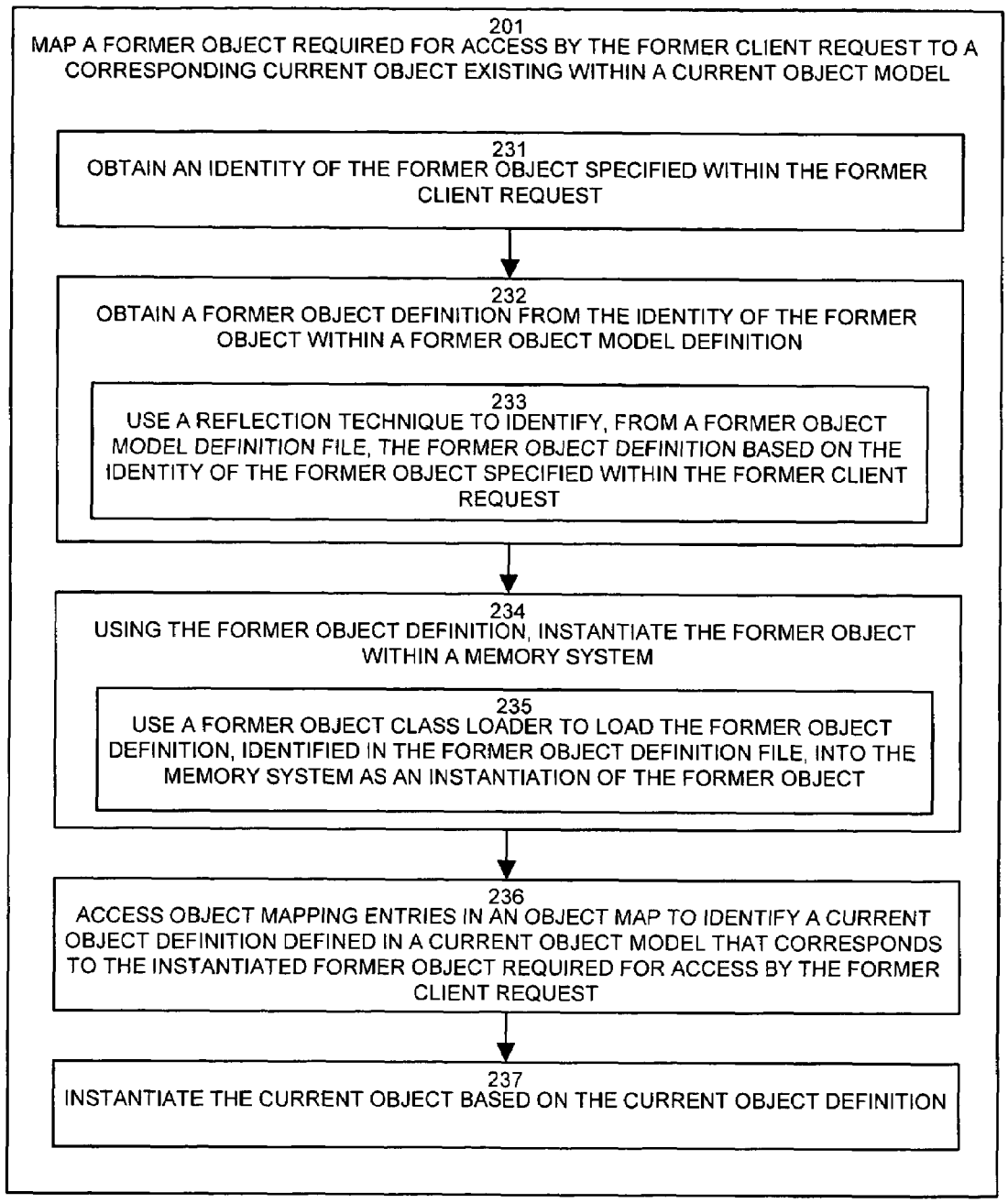
FIG. 4 is a flow chart of processing steps that a server application configured according to embodiments of the invention performs to instantiate and map a former object required for access by a former client request to a corresponding current object existing within the current object model.

FIG. 4 is a flow chart of processing steps that a server application 132 configured according to embodiments of the invention performs to instantiate and map a former object 143 required for access by the former client request 115 to a corresponding current object 144 existing within the current object model 155. That is, flow chart in FIG. 3 shows details of processing step 200 from FIG. 2. In this example embodiment, the former object 143 and current object 144 are defined in an object-oriented programming language such as Java.

In step 231, the server application 132 obtains an identity of the former object 143 specified within the former client request 115. In other words, the server application 132 in step 231 parses the former client request 115 in order to identify what former objects 143 will be required to be instantiated for proper servicing of this request 115.

In step 232, the server application 132 obtains a former object definition from (i.e., based upon) the identity of the former object within a former object model definition 145. In other words, the former object model definition 145 can be a set of class definitions that define objects associated with the former object model upon which the former client 121 is created. Accordingly, in step 232 in sub-steps 233, the object adapter 140 obtains the identity of any former objects 143 that are required to be instantiated.

In sub-step 233, the server application 132 uses a reflection technique such as Java reflection to identify, from a former object model definition file 145, the former object definition(s) based on the identity of the former object(s) specified within the former client request 115.

Next, in step 234, the server application 132 uses the former object definition to instantiate the former object 143, for example, within a memory system.

In sub-step 235, this can include the server application 132 using a former object class loader to load the former object definition, identified in the former object definition file 145, into the memory system as an instantiation of the former object 143. Accordingly, by using a separate class loader, the set of instantiated former objects 143 is maintained in memory separately from the set of instantiated current objects 137 obtained by the current or system object loader 136 from the repository 150.

At this point in processing, the object adapter 140 has identified classes that define the required object structures for the set of former objects 143 that will be needed for proper processing of the former client request 115. These former objects 143 are also now instantiated in memory. However, what is now required is to identify any current objects 156 within the repository 150 that contain data that must be then copied from an instantiation of those current objects 144 into the instantiation of the former objects 143 that has just been created. The object map 146 serves this purpose of correlating which current objects 156 contain appropriate data fields for population of data within the newly instantiated former objects 143. In other words, at this point in processing the instantiation of the former object(s) 143 is/are void of meaningful data and must be populated from appropriate data fields within current objects 156.

In step 236, the server application 132 accesses object mapping entries in an object map 146 to identify a current object definition defined in a current object model 155 that corresponds to the instantiated former object 143 required for access by the former client request. As an example, in one embodiment the object map 146 contains the table of former object or class names defined within the former object model 145 to current object or class names defined within the current object model 155. Using the correlation between the former and current class names, the former object loader 142 within the object adapter 140 can identify which current objects 156 within the repository 150 contain data they can be used to populate data fields within the former objects 143.

In step 237, the server application 132 instantiates the current object(s) 144 based on the current object definitions discovered in step 236 using the object map 146. In this manner, the object map serves as an object relationship map between different versions of the object model.

Figure 5:
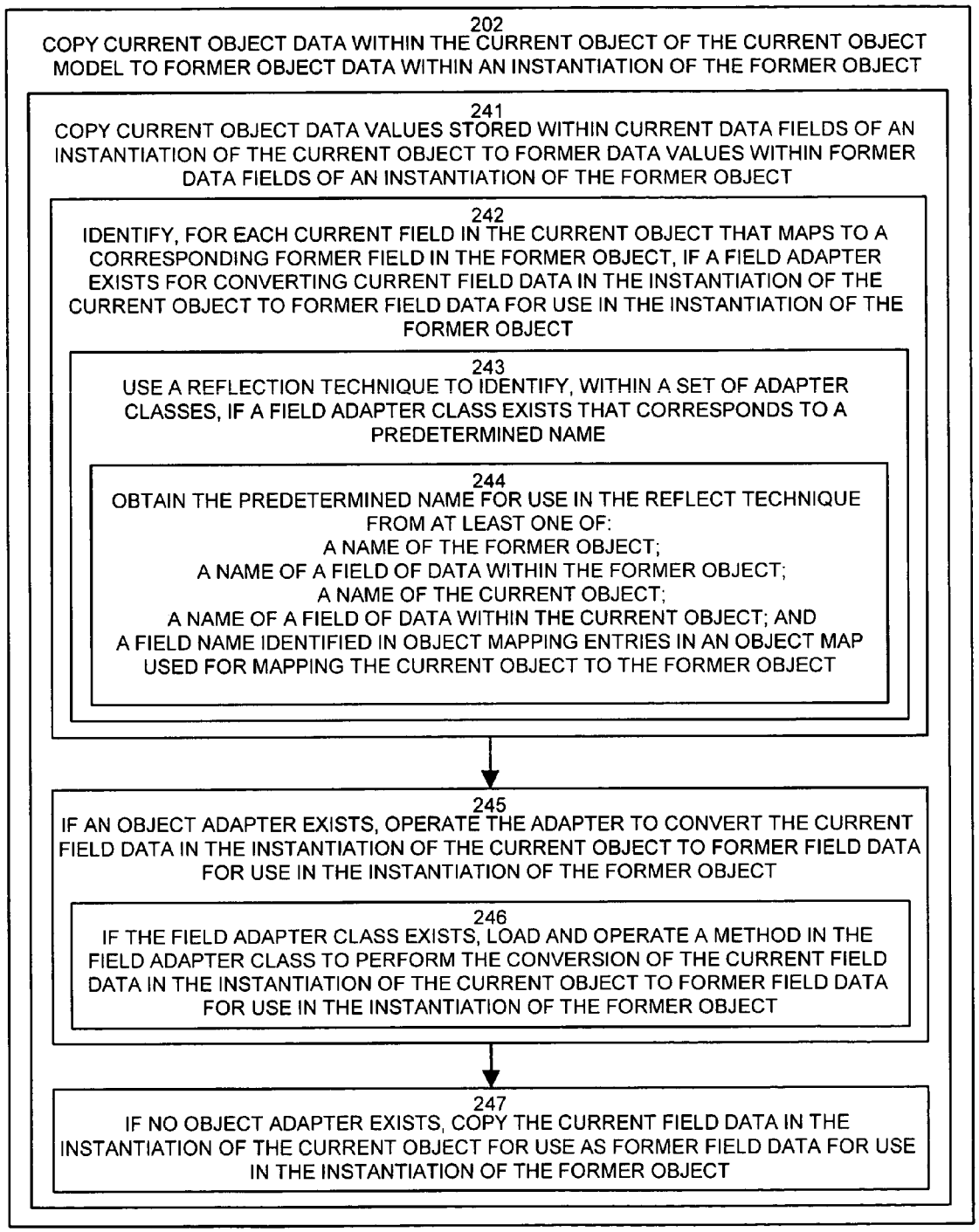
FIG. 5 is a flow chart of processing steps that a server application configured according to embodiments of the invention performs to copy current object data within a current object of the current object model to former object data within an instantiation of a former object.

FIG. 5 is a flow chart of processing steps that a server application 132 configured according to embodiments of the invention performs to copy current object data within the current object 144 of the current object model to former object data within an instantiation of the former object 143.

In step 241, the server application 132 copies current object data values stored within current data fields of an instantiation of the current object 144 to former data values within former data fields of an instantiation of the former object 143. To do so, the server application 132 performs sub-steps 242 through 247.

In sub-step 242, the server application 132 identifies, for each current field in the current object that maps to a corresponding former field in the former object, if a field adapter 141 exists for converting current field data in the instantiation of the current object 144 to former field data for use in the instantiation of the former object 143.

To identify such fields, in sub-step 243, the server application 132 uses a reflection technique to identify, within a set of adapter classes (e.g., field adapters 141), if a field adapter class exists that corresponds to a predetermined name.

In one example embodiment as shown in sub-step 244, the server application 132 obtains a predetermined name for use in the reflection technique from either a name of the former object 143, a name of a field of data within the former object, a name of the current object 144, a name of a field of data within the current object and/or a field name identified in object mapping entries in an object map used for mapping the current object to the former object. In other words, in steps 243 and 244, the object adapter 140 uses reflection based upon, for example, each field name within the instantiated former object 143, to determine if a field adapter class 141 exists to be used for conversion of data within that particular data field of the current object 144 for population within a corresponding field within the instantiation of the former object 143.

Next, in step 245, if a field adapter exists, the server application 132 operates the field adapter 141 to convert the current field data in the instantiation of the current object 144 to former field data for use in the instantiation of the former object 143.

As shown in step 246, if the field adapter class 141 exists that matches the naming convention used for mapping field data from the current object to the former object (the object map 146 came contain the string or other information to be used for the reflection technique to determine the proper field adapter exists for each object field), then the server application 132 loads and operates a method in the field adapter class 141 to perform the conversion of the current field data in the instantiation of the current object 144 to former field data for use in the instantiation of the former object 143. In this manner, those data fields within the current object 144 that must be specifically converted are handled by utilizing a field adapter 141 for conversion of the data into a proper format for use within the former object 143. As an example, if the data stored within the current object 144 in a particular data field is in a value expressed in terabytes by a corresponding data field in the former object 143 requires this value in megabytes, the object map 146 can specify the string to use for the reflection technique to identify specific field adapter 141 exists for this data field. Assuming the field adapter 141 exists, the processing of the field adapter 141 will convert the terabyte data value into megabytes.

In step 247, if no field adapter exists for the particular data field of the former object 143, the server application 132 copies the current field data in the instantiation of the current object 144 for use as former field data for use in the instantiation of the former object 143 without performing any special conversion of the data. In other words, in step 247, if no special field adapter 141 exists for the particular data field, the server application 132 performs a straight copy of the data from a field within the current object 144 to a field within the former object 143.

The processing of steps 241 and its sub-steps is repeated such that the server application copies current object data values stored within current data fields of an instantiation of the current object 144 to former data values within former data fields of an instantiation of the former object 143, thus producing the former object instantiation 143 containing all of the required data for proper processing of the former client requests 115 by the server application 132.

Figure 6:
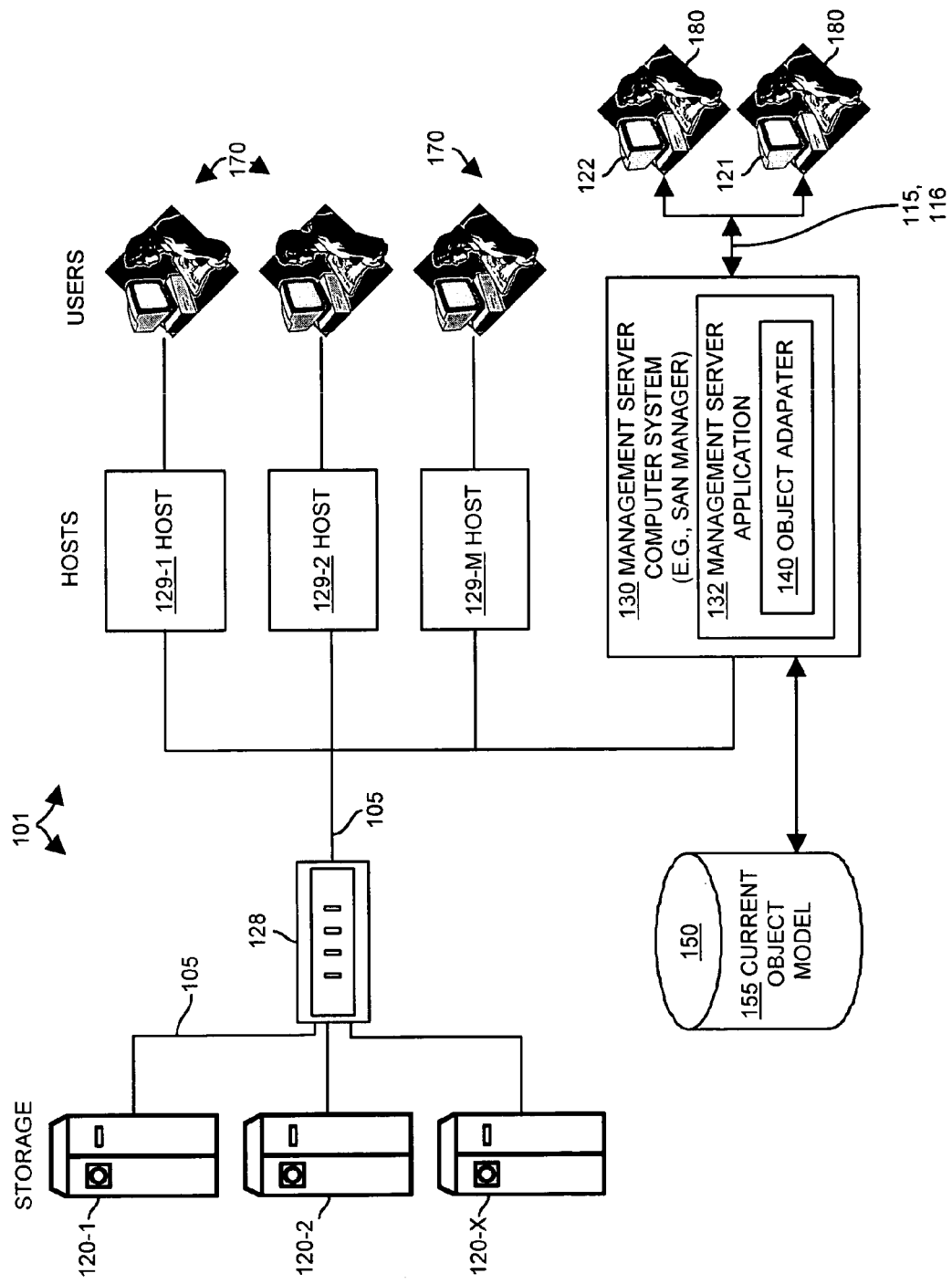
FIG. 6 is a flow chart of processing steps performed by a management application to assign management responsibility to agents for resources based on the decision made in the processing of FIG. 5 according to embodiments of the invention.

FIG. 6 illustrates another example of a network environment 101 in which embodiments of the invention can beneficially operate. In this example, the network is a storage area network 101 that includes a communications medium 105 that interconnects a plurality of data storage systems 120-1 through 120-X through one or more connectivity devices 128 (e.g., storage area network switches) to a plurality of host computer systems 129. According to the general operation of the storage area network shown in FIG. 1, the host computer systems 129 operate applications that require access to data stored within the data storage systems over the storage area network 100.

Also illustrated in this example storage area network 100 is a management server computer system 130 that operates a management application 132 (i.e., a server software application) that includes an object adapter 140 configured in accordance with embodiments of the invention. The management application 132 accesses a current object model 155 within the repository 150. The current object model 155 is a set of current or "more up to date" object definitions (in comparison with former objects) that, when instantiated in memory or when stored in the repository, contain management data for the storage area network 101. A network administrator 180 interacts via former client 121 and current client 122 (e.g., operating on other computer systems) with the management application 132 executing on the management server computer system 130 in order to remotely administer manageable resources within the storage area network 100. The former client 121, as noted in the earlier example, is written, engineered, or built to understand the former object model. As such, the object adapter 140 operates as explained herein to provide compatibility between the former client 121 and the management application 132 that uses the current object model 155.

It is to be understood that various alternative configurations can be provided by embodiments of the invention other than those discussed above. As an example, alternative arrangements of the invention may include rearranging the processing steps explained above in the flow charts in such a way that the overall effect of the invention is the same. It is to be thus understood by those skilled in the art that the particular arrangement or order of processing steps in many instances does not specify implementation of embodiments of the invention. As such, those skilled in the art of software development and computer-related technologies will understand that there can be many ways and orders of representing the processing operations explained above and such alternative software code will still achieve the overall effects explained herein. In addition, embodiments of the invention are not limited to operation on the computer systems described above. The object adapter 140 and management server 132 can operate on shared computing resources, or can be distributed among any number of computer systems. Furthermore, embodiments of the invention are not limited to operation in a storage area network management application, but are intended to be generally applicable to any type of management application. Accordingly, embodiments of the invention are not limited to the processing arrangements explained above.

What is claimed is:

1. A method for processing client requests supporting a plurality of object models, the method comprising:
   receiving a former client request requiring access to a former object defined by a former object model;
   mapping a former object required for access by the former client request to a corresponding current object existing within a current object model;
   copying current object data within the current object of the current object model to former object data within an instantiation of the former object, the copying further comprising:
      copying current object data values stored within current data fields of an instantiation of the current object to former data values within former data fields of an instantiation of the former object, the copying current object data values includes:
         identifying, for each current field in the current object that maps to a corresponding former field in the former object, if a field adapter exists for converting current field data in the instantiation of the current object to former field data for use in the instantiation of the former object, and
            i) if an object adapter exists, operating the adapter to convert the current field data in the instantiation of the current object to former field data for use in the instantiation of the former object; and
            ii) if no object adapter exists, copying the current field data in the instantiation of the current object for use as former field data for use in the instantiation of the former object; and
   processing the former client request using the instantiation of the former object to satisfy the former client request.

2. The method of claim 1 wherein receiving a former client request requiring access to a former object defined by a former object model comprises:
   exposing a former service interface for use by former clients for receipt of former client requests;
   receiving the former client request on the former service interface; and
   forwarding the former client request via the former service interface to an former client adapter for processing of the former client request.

3. The method of claim 2 wherein exposing a former service interface for use by former clients for receipt of former client requests comprises:
   providing a former remote method invocation interface for former clients to use to provide former client requests for processing; and
   concurrently providing a current remote method invocation interface for current clients to use to provide current client requests for processing.

4. The method of claim 2 wherein mapping a former object required for access by the former client request to a corresponding current object existing within a current object model comprises:
   obtaining an identity of the former object specified within the former client request;
   obtaining a former object definition from the identity of the former object within a former object model definition; and
   using the former object definition, instantiating the former object within a memory system.

5. The method of claim 4 wherein:
   the former object and current object are defined in an object-oriented programming language; and
   wherein obtaining a former object definition comprises:
      using a reflection technique to identify, from a former object model definition file, the former object definition based on the identity of the former object specified within the former client request; and
   wherein instantiating the former object within a memory system comprises:
      using a former object class loader to load the former object definition, identified in the former object definition file, into the memory system as an instantiation of the former object.

6. The method of claim 4 wherein mapping a former object required for access by the former client request to a corresponding current object existing within a current object model comprises:
   accessing object mapping entries in an object map to identify a current object definition defined in a current object model that corresponds to the instantiated former object required for access by the former client request; and
   instantiating the current object based on the current object definition.

7. The method of claim 6 wherein copying current object data within the current object of the current object model to former object data within an instantiation of the former object comprises:
   copying current object data values stored within current data fields of an instantiation of the current object to former data values within former data fields of an instantiation of the former object.

8. The method of claim 7 wherein copying current object data values stored within current data fields of an instantiation of the current object to former data fields within an instantiation of the former object comprises:
   identifying, for each current field in the current object that maps to a corresponding former field in the former object, if a field adapter exists for converting current field data in the instantiation of the current object to former field data for use in the instantiation of the former object, and
      i) if an object adapter exists, operating the adapter to convert the current field data in the instantiation of the current object to former field data for use in the instantiation of the former object; and
      ii) if no object adapter exists, copying the current field data in the instantiation of the current object for use as former field data for use in the instantiation of the former object.

9. The method of claim 8 wherein identifying, for each current field in the current object that maps to a corresponding former field in the former object, if a field adapter exists for converting current field data in the instantiation of the current object to former field data for use in the instantiation of the former object comprises:
   using a reflection technique to identify, within a set of adapter classes, if a field adapter class exists that corresponds to a predetermined name;
   and if the field adapter class exists, loading and operating a method in the field adapter class to perform the conversion of the current field data in the instantiation of the current object to former field data for use in the instantiation of the former object.

10. The method of claim 9 wherein using a reflection technique to identify, within a set of adapter classes, if a field adapter class exists that corresponds to a predetermined name comprises:
obtaining the predetermined name for use in the reflect technique from at least one of:
a name of the former object;
a name of a field of data within the former object;
a name of the current object;
a name of a field of data within the current object; and
a field name identified in object mapping entries in an object map used for mapping the current object to the former object.

11. The method of claim 1 wherein identifying, for each current field in the current object that maps to a corresponding former field in the former object, if a field adapter exists for converting current field data in the instantiation of the current object to former field data for use in the instantiation of the former object comprises:
using a reflection technique to identify, within a set of adapter classes, if a field adapter class exists that corresponds to a predetermined name; and
if the field adapter class exists, loading and operating a method in the field adapter class to perform the conversion of the current field data in the instantiation of the current object to former field data for use in the instantiation of the former object.

12. The method of claim 1 wherein:
the operations of receiving a former client request, mapping a former object to a corresponding current object, copying current object data within the current object to former object data within an instantiation of the former object and processing the former client request are performed within a current version of a storage area network management application; and
wherein receiving a former client request comprises:
receiving the former client request from a former version of a storage area network management client application, the former client request containing a request for access to former storage area network management object data contained within former objects defined by a former object model that has been replaced by the current object model; and
wherein the steps of mapping, copying and processing the former client request allow the former version of the storage area network management client application to operate with the current version of the storage area network management application that maintains storage area network management data within current objects conforming to the current object model.

13. A computer system comprising:
a memory;
a processor;
a communications interface;
an interconnection mechanism coupling the memory, the processor and the communications interface;
wherein the memory is encoded with a server application including an object adapter that when performed on the processor, is operable to process client requests supporting a plurality of object models by causing the computer system to perform the operations of:
receiving, via the communications interface into the memory, a former client request requiring access to a former object defined by a former object model;
mapping a former object required for access by the former client request to a corresponding current object existing within a current object model;
copying current object data within the current object of the current object model to former object data within an instantiation of the former object, the copying further comprising:
copying current object data values stored within current data fields of an instantiation of the current object to former data values within former data fields of an instantiation of the former object, the copying current object data values includes:
identifying, for each current field in the current object that maps to a corresponding former field in the former object, if a field adapter exists for converting current field data in the instantiation of the current object to former field data for use in the instantiation of the former object, and
i) if an object adapter exists, operating the adapter to convert the current field data in the instantiation of the current object to former field data for use in the instantiation of the former object; and
ii) if no object adapter exists, copying the current field data in the instantiation of the current object for use as former field data for use in the instantiation of the former object; and
processing the former client request using the instantiation of the former object to satisfy the former client request.

14. The computer system of claim 13 wherein when the service application causes the computer system to perform the operation of receiving a former client request requiring access to a former object defined by a former object model, the service application causes the computer system to perform the operations of:
exposing a former service interface for use by former clients for receipt of former client requests;
receiving the former client request on the former service interface; and
forwarding the former client request via the former service interface to an former client adapter for processing of the former client request.

15. The computer system of claim 14 wherein when the service application causes the computer system to perform the operation of exposing a former service interface for use by former clients for receipt of former client requests, the service application causes the computer system to perform the operations of:
providing a former remote method invocation interface for former clients to use to provide former client requests for processing; and
concurrently providing a current remote method invocation interface for current clients to use to provide current client requests for processing.

16. The computer system of claim 14 wherein when the service application causes the computer system to perform the operation of mapping a former object required for access by the former client request to a corresponding current object existing within a current object model, the service application causes the computer system to perform the operations of:
obtaining an identity of the former object specified within the former client request;
obtaining a former object definition from the identity of the former object within a former object model definition; and
using the former object definition, instantiating the former object within a memory system.

17. The computer system of claim 16 wherein:
the former object and current object are defined in an object-oriented programming language; and wherein when the service application causes the computer system to perform the operation of obtaining a former object definition, the service application causes the computer system to perform the operation of:
using a reflection technique to identify, from a former object model definition file, the former object definition based on the identity of the former object specified within the former client request; and
wherein when the service application causes the computer system to perform the operation of instantiating the former object within a memory system, the service application causes the computer system to perform the operation of:
using a former object class loader to load the former object definition, identified in the former object definition file, into the memory system as an instantiation of the former object.

18. The computer system of claim 16 wherein when the service application causes the computer system to perform the operation of mapping a former object required for access by the former client request to a corresponding current object existing within a current object model the service application causes the computer system to perform the operation of:
accessing object mapping entries in an object map to identify a current object definition defined in a current object model that corresponds to the instantiated former object required for access by the former client request; and
instantiating the current object based on the current object definition.

19. The computer system of claim 18 wherein when the service application causes the computer system to perform the operation of copying current object data within the current object of the current object model to former object data within an instantiation of the former object, the service application causes the computer system to perform the operation of:
copying current object data values stored within current data fields of an instantiation of the current object to former data values within former data fields of an instantiation of the former object.

20. The computer system of claim 19 wherein when the service application causes the computer system to perform the operation of copying current object data values stored within current data fields of an instantiation of the current object to former data fields within an instantiation of the former object, the service application causes the computer system to perform the operations of:
identifying, for each current field in the current object that maps to a corresponding former field in the former object, if a field adapter exists for converting current field data in the instantiation of the current object to former field data for use in the instantiation of the former object, and
  i) if an object adapter exists, operating the adapter to convert the current field data in the instantiation of the current object to former field data for use in the instantiation of the former object; and
  ii) if no object adapter exists, copying the current field data in the instantiation of the current object for use as former field data for use in the instantiation of the former object.

21. The computer system of claim 20 wherein when the service application causes the computer system to perform the operation of identifying, for each current field in the current object that maps to a corresponding former field in the former object, if a field adapter exists for converting current field data in the instantiation of the current object to former field data for use in the instantiation of the former object, the service application causes the computer system to perform the operations of:
using a reflection technique to identify, within a set of adapter classes, if a field adapter class exists that corresponds to a predetermined name; and
if the field adapter class exists, loading and operating a method in the field adapter class to perform the conversion of the current field data in the instantiation of the current object to former field data for use in the instantiation of the former object.

22. The computer system of claim 21 wherein when the service application causes the computer system to perform the operation of using a reflection technique to identify, within a set of adapter classes, if a field adapter class exists that corresponds to a predetermined name, the service application causes the computer system to perform the operation of:
obtaining the predetermined name for use in the reflect technique from at least one of:
a name of the former object;
a name of a field of data within the former object;
a name of the current object;
a name of a field of data within the current object; and
a field name identified in object mapping entries in an object map used for mapping the current object to the former object.

23. The computer system of claim 13 wherein when the service application causes the computer system to perform the operation of identifying, for each current field in the current object that maps to a corresponding former field in the former object, if a field adapter exists for converting current field data in the instantiation of the current object to former field data for use in the instantiation of the former object, the service application causes the computer system to perform the operations of:
using a reflection technique to identify, within a set of adapter classes, if a field adapter class exists that corresponds to a predetermined name; and
if the field adapter class exists, loading and operating a method in the field adapter class to perform the conversion of the current field data in the instantiation of the current object to former field data for use in the instantiation of the former object.

24. The computer system of claim 13 wherein:
the operations of receiving a former client request, mapping a former object to a corresponding current object, copying current object data within the current object to former object data within an instantiation of the former object and processing the former client request are performed within a current version of a storage area network management application executing on the computer system; and
wherein when the service application causes the computer system to perform the operation of receiving a former client request, the service application causes the computer system to perform the operation of:
receiving the former client request from a former version of a storage area network management client application, the former client request containing a request for access to former storage area network management object data contained within former objects defined by a former object model that has been replaced by the current object model; and
wherein the steps of mapping, copying and processing the former client request allow the former version of the storage area network management client application, operating on a computer system in communication with the computer system operating the server application, to operate with the current version of the storage area network management application that maintains storage area network management data within current objects conforming to the current object model.

25. A computer program product having a computer-readable medium including computer program logic encoded thereon that, when executed on a computer system, processes client requests supporting a plurality of object models by causing the computer system to perform the operations of:

receiving a former client request requiring access to a former object defined by a former object model;

mapping a former object required for access by the former client request to a corresponding current object existing within a current object model;

copying current object data within the current object of the current object model to former object data within an instantiation of the former object, the copying further comprising:

copying current object data values stored within current data fields of an instantiation of the current object to former data values within former data fields of an instantiation of the former object, the copying current object data values includes:

identifying, for each current field in the current object that maps to a corresponding former field in the former object, if a field adapter exists for converting current field data in the instantiation of the current object to former field data for use in the instantiation of the former object, and i) if an object adapter exists, operating the adapter to convert the current field data in the instantiation of the current object to former field data for use in the instantiation of the former object; and ii) if no object adapter exists, copying the current field data in the instantiation of the current object for use as former field data for use in the instantiation of the former object; and processing the former client request using the instantiation of the former object to satisfy the former client request.

26. A method for processing client requests supporting a plurality of object models, the method comprising:

receiving a plurality of requests from former client versions requiring access to respective former objects defined by respective former object models, wherein the object models are shared object models;

exposing former service interfaces for use by former client versions for receipt of requests from former client versions;

mapping former objects, required for access by the requests from former client versions, to a corresponding current object existing within a current object model, wherein the current object model is a shared model, and wherein the current object model is not directly backwards compatible with the requests from former client versions;

wherein mapping former objects further comprises indicating current objects that correspond to former objects defined in a former object definition file, and data within the current objects that correspond to data in the former objects;

copying current object data from fields of the current object of the current object model to former object data within an instantiation of the former objects, the copying further comprising:

copying current object data values stored within current data fields of an instantiation of the current object to former data values within former data fields of an instantiation of the former object, the copying current object data values includes:

identifying, for each current field in the current object that maps to a corresponding former field in the former object, if a field adapter exists for converting current field data in the instantiation of the current object to former field data for use in the instantiation of the former object, and i) if an object adapter exists, operating the adapter to convert the current field data in the instantiation of the current object to former field data for use in the instantiation of the former object; and ii) if no object adapter exists, copying the current field data in the instantiation of the current object for use as former field data for use in the instantiation of the former object; and processing the requests from former client versions using the instantiation of the former objects to satisfy the former client requests, thereby providing backwards compatibility.

* * * * *